Nov. 12, 1957  O. M. WHITTEN  2,812,639
BOOSTER DEVICE
Filed Feb. 25, 1954  3 Sheets-Sheet 1
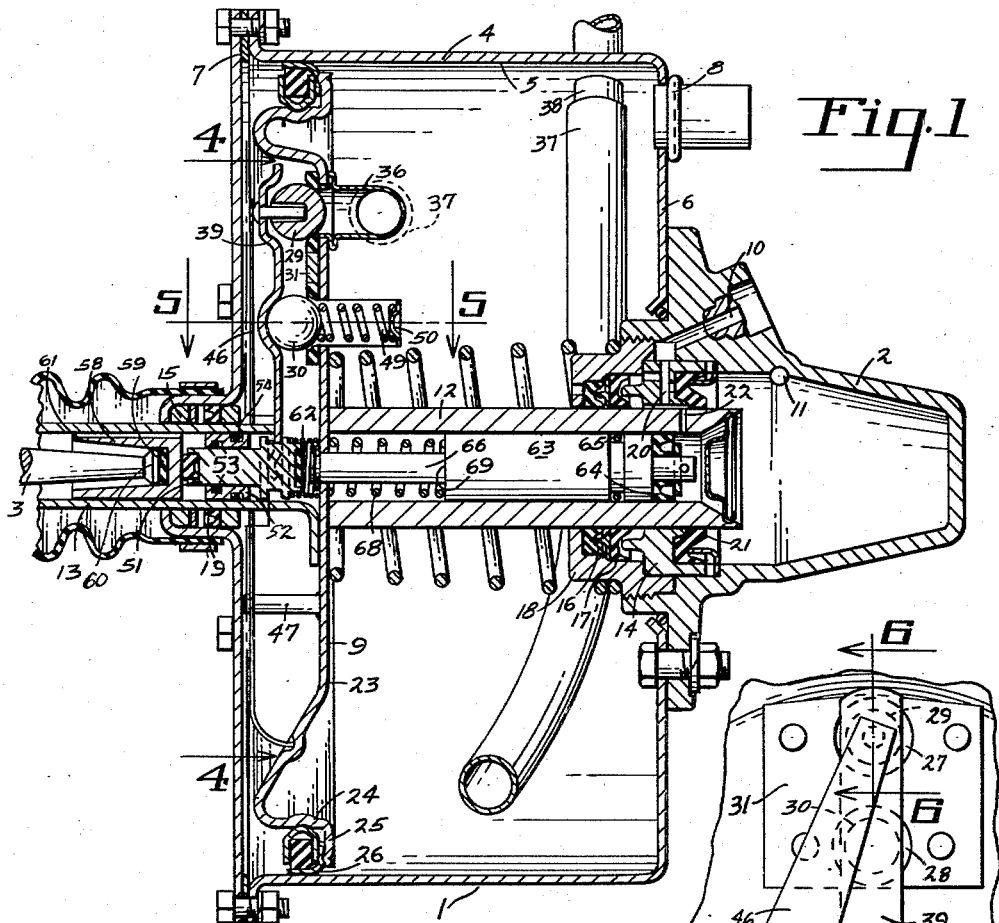
Fig.1
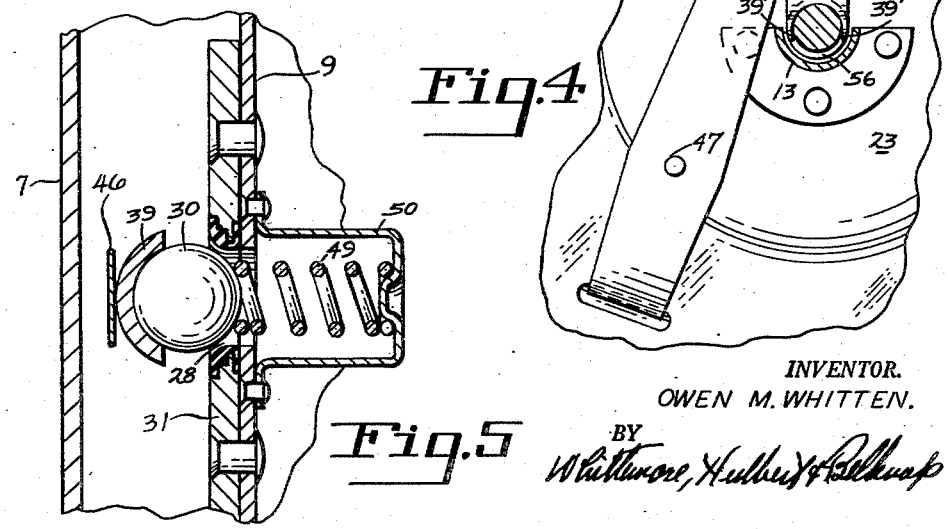
Fig.4
Fig.5
INVENTOR.
OWEN M. WHITTEN.
BY Nov. 12, 1957    O. M. WHITTEN    2,812,639
BOOSTER DEVICE
Filed Feb. 25, 1954    3 Sheets-Sheet 2
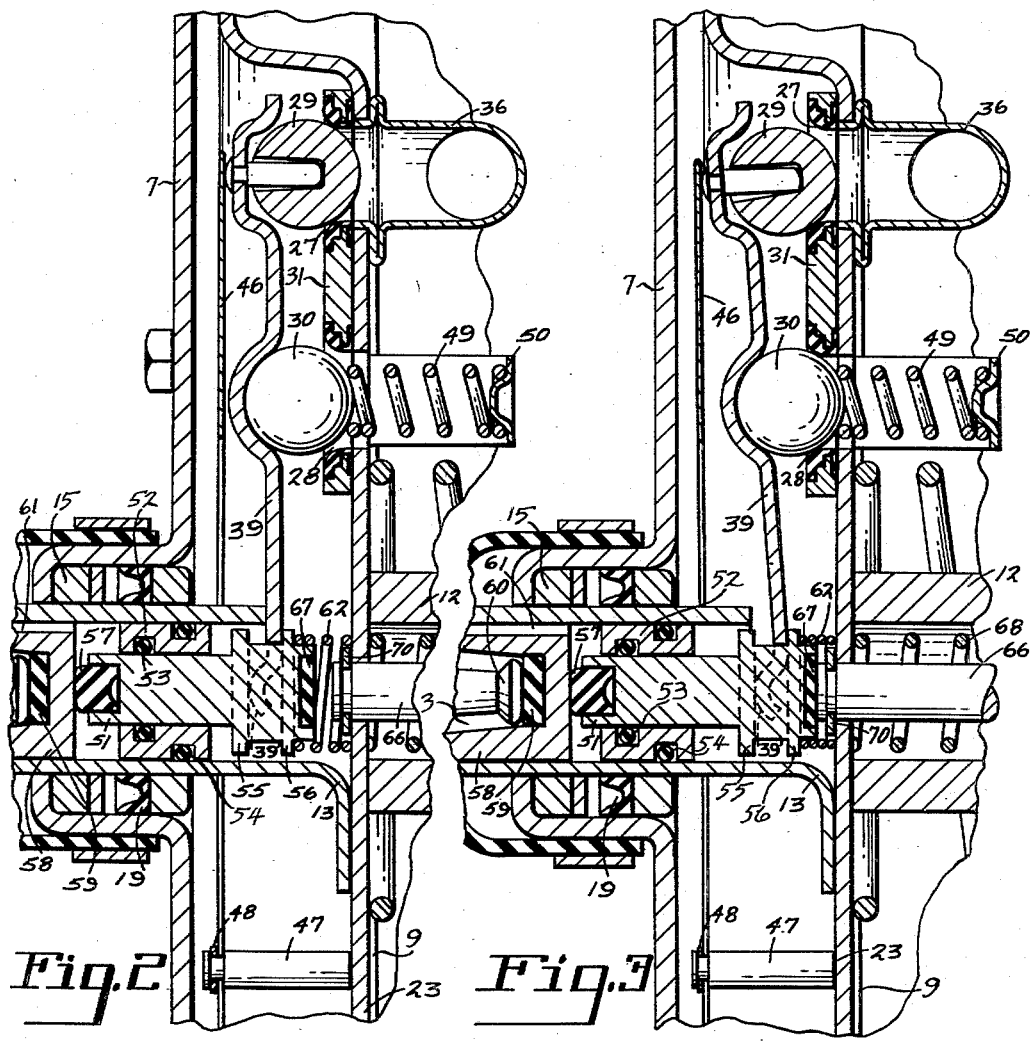
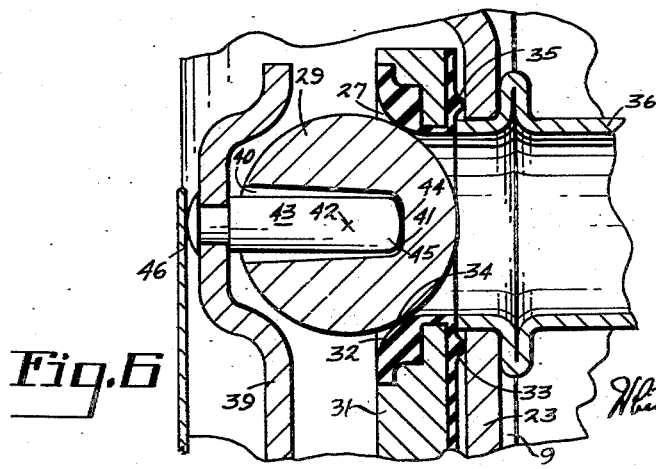
INVENTOR.
OWEN M. WHITTEN.

Nov. 12, 1957 — O. M. WHITTEN — 2,812,639
BOOSTER DEVICE
Filed Feb. 25, 1954 — 3 Sheets-Sheet 3

INVENTOR.
OWEN M. WHITTEN.
BY

United States Patent Office 2,812,639
Patented Nov. 12, 1957

2,812,639

BOOSTER DEVICE

Owen M. Whitten, Detroit, Mich., assignor to Kelsey-Hayes Company, a corporation of Delaware Application February 25, 1954, Serial No. 412,536

8 Claims. (Cl. 60—54.6)

The invention relates to booster devices and refers more particularly to booster devices for use in hydraulic brake systems of motor vehicles and of that type having a booster and a hydraulic cylinder forming a unit which is brought into operation by the actuation of a manually operable element, such as a foot pedal.

The invention has for some of its objects to provide a booster device which may be brought into operation by manually exerting low pressure; and to provide a booster device having an improved valve actuating mechanism so constructed that the effect of the pressure within the variable pressure chamber of the booster upon the actuating mechanism is greatly reduced.

The invention has for another object to provide a booster device having an improved valve mechanism comprising valves and a lever in which the valves are located so that the lever may have lever arms which are highly advantageous in the operation of the valves.

The invention has for further objects to provide a booster device having an improved valve construction in which a valve, when moving into and out of sealing engagement with its seat, is rotatable or adapted to roll over the seat so that the seat is not scuffed and effective life of the valve construction is increased; and to provide a booster device having a valve and mounting for the valve so constructed that the valve rolls over both its seat and mounting while the valve is moving into and out of sealing engagement.

With these and other objects in view the invention resides in the novel features of construction and combinations and arrangements of parts as more fully hereinafter set forth.

In the drawings:

Figure 1 is a sectional view of a booster device embodying the invention;

Figure 2 is an enlarged view of a portion of Figure 1;

Figure 3 is a similar view showing the parts in another position;

Figure 7:
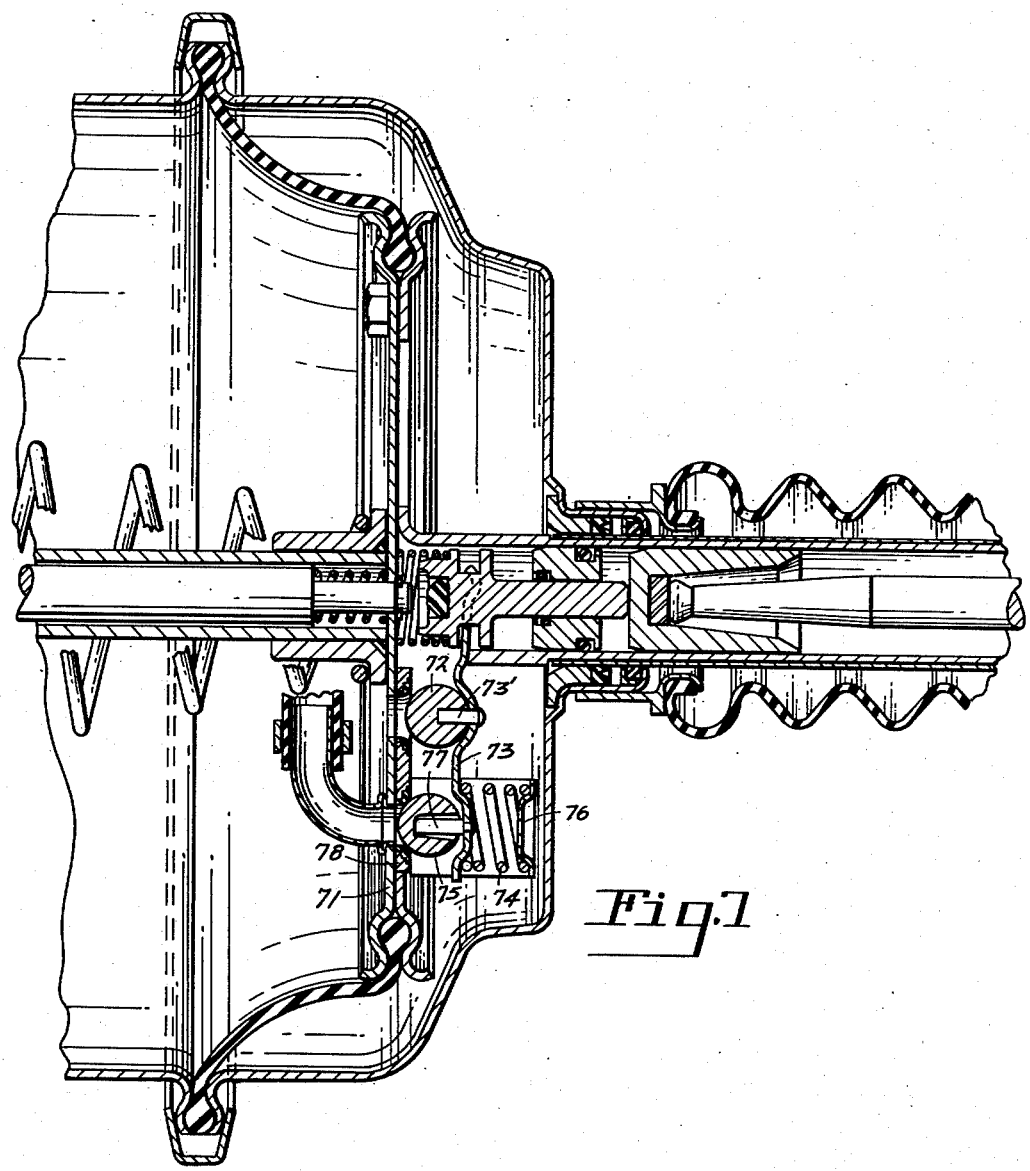

Figures 4 and 5 are cross-sections on the lines 4—4 and 5—5 of Figure 1;

Figure 6 is an enlarged cross-section on the line 6—6 of Figure 4;

Figure 7 is a view similar to Figure 1 showing a modified construction of booster device.

As illustrated in Figures 1 to 6, inclusive, the booster device comprises the booster 1, the hydraulic cylinder 2, and the manually operable push rod 3. The booster has the housing 4 formed with the cylindrical side wall 5, the integral end wall 6 at its front end, and the closure 7 secured to its rear end. The front end wall 6 is provided with the vacuum port 8 which is adapted to be connected to a suitable source of vacuum, such as the intake manifold of an internal combustion engine of a motor vehicle, a conventional check valve being provided in the line to the intake manifold permitting the passage of air through the line to the intake manifold but preventing flow of air in the reverse direction. The booster has the power piston 9 reciprocable within the side wall 5. The cylinder 2 is secured to the front end wall 6 of the housing and has the braking liquid inlet port 10 near its rear end adapted to be connected to a reservoir for braking liquid and the braking liquid outlet port 11 between its ends adapted to be connected to a hydraulic motor, such as a wheel cylinder, for operating a brake of the motor vehicle. The push rod 3 extends axially of and rearwardly from the booster and is adapted to be connected to a manually operable element, such as a foot pedal.

The tubular power plunger 12 and the tubular member 13 are secured to the power piston 9 in axial alignment and the power plunger extends forwardly into the cylinder 2 and the tubular member extends rearwardly through the closure 7. The power plunger slidably engages the bearing 14 at the rear end of the cylinder 2 and the tubular member slidably engages the bearing 15 in the closure 7. Suitable seals 16 and 17 are located between the power plunger 12 and the nut 18 at the rear end of the cylinder 2 and a suitable seal 19 is located between the tubular member 13 and the closure 7. The bearing 14 has the braking inlet port 20 registering with the port 10. The power plunger extends through the seals 16 and 17, the bearing 14, and the seal 21 at the front side of the bearing into the cylinder 2, and has near its front end the port 22 which in the retracted position of the power plunger communicates with the port 20 and in the operative position is located forwardly of this port so that communication of the cylinder 2 with the reservoir is cut off. The internal diameter of the tubular member 13 is such that it provides for the angular movement of the push rod 3 occurring during its forward and rearward movement.

The power piston 9 comprises the sheet metal disk 23 which is formed with the concentric annular flange 24 and the terminal radial flange 25 in its outer peripheral portion carrying the sealing ring 26 which slidably engages the side wall 5 of the housing. The power piston is provided with air and vacuum passages therethrough the rear portions of which are formed of the annular seats 27 and 28 for sealing engagement by the air and vacuum valves 29 and 30 respectively.

The annular seats 27 and 28 are like annular rubber inserts extending through holes in the plate 31 and bonded to the plate, each insert having the portion 32 at the rear side of the plate and the portion 33 at the front side of the plate. The rear portion has the rearwardly facing convex arcuate valve bearing surface 34 and the front portion has the concentric forwardly extending annular rib 35 which forms an air seal between the disk 23 and the plate 31 which is fixedly secured to the disk by suitable means such as rivets with the holes in the disk and plate in axial registration. The air and vacuum passages are radially aligned at one side of the axis of the power piston and the vacuum passage is located radially inwardly of the air passage and approximately midway between the air passage and the axis of the power piston. The air passage is connected to the atmospheric air outside the housing 4 by the elbow 36 fixedly secured to the front side of the disk 23 and the flexible spiral tube 37 extending from the elbow to the nipple 38 which is secured to and extends through the housing and is suitably connected to an air filter outside the housing. The vacuum passage communicates at all times with the vacuum chamber of the booster at the front side of the power piston 9.

The air and vacuum valves 29 and 30 are ball valves of a diameter which is greater than the diameter of the bearing surfaces 34 of the seats. These valves are located in the variable pressure chamber of the booster at the rear side of the power piston 9 and are movable into sealing engagement with the seats by the lever 39 forming part of the valve actuating mechanism. The air valve 29 is rotatable or adapted to roll over the seat 27 when moving into and out of sealing engagement with the seat to thereby avoid scuffing of the seat and increase the effective life of the valve construction. In detail, the air valve has the recess 40 extending at right angles to the partly spherical surface of the ball for sealing engagement with the seat. The recess opens toward the lever and tapers from its open end to its bottom 41 which is located beyond the center of gravity 42 of the air valve and between the center of gravity and the seat engaging surface of the air valve. The lever 39 has secured thereto the shouldered cylindrical mounting pin 43 which extends freely or loosely into the recess 40 and engages the bottom 41 and holds the air valve spaced from the lever. The free end of the mounting pin has the center spherical zone 44 of one radius and the corner spherical zone 45 of a smaller radius, the arrangement being such that the air valve is rotatable or adapted to roll over the mounting pin when rolling over the seat, the relative positions being shown in Figures 2 and 3.

The air valve 29 is resiliently urged toward its seat by means of the leaf spring 46 which extends past the tubular member 13 and has one end abutting the headed over end of the mounting pin 43; the other end abutting the disk 23 and a portion near the last mentioned end secured to the disk by the pin 47 and C-washer 48. The leaf spring has a strength sufficient to overcome the differential of air presures at opposite sides of the air valve to close this valve. A coil spring 49 urges the vacuum valve 30 to open position, the strength of this spring being sufficient to overcome the differential of air pressures at opposite sides of the vacuum valve to open the same. The coil spring has one end abutting the vacuum valve 30 and the other end abutting the bottom of the yoke 50, the sides of which are fixedly secured to the front side of the disk 23.

To reduce the effect of the pressure within the variable pressure chamber of the booster at the rear of the power piston 9 I have provided means forming part of the valve actuating mechanism and located between the push rod 3 and the lever 39 having areas subject to the pressure within the variable pressure chamber and to the pressure of atmospheric air which are appreciably smaller than the internal cross sectional area of the tubular member 13. In detail a plunger 51 is slidable in the bearing 52 which has a press fit in the front end portion of the tubular member 13. The O-rings 53 and 54 between the plunger and bearing and between the bearing and tubular member prevent passage of air. The plunger is formed at its front end with the radially extending annular flanges 55 and 56 between which the furcations 39' of the lever 39 extend, the tubular member 13 being cut away to receive the lever. The plunger has at its rear end the sound deadening disk 57 abutting the slide 58 in the tubular member 13 and this slide has the sound deadening disk 59 for abutting the head 60 at the front end of the push rod 3. The slide is provided with the axially extending peripheral grooves 61 for the passage of atmospheric air. It will thus be seen that with this construction the effective area of the plunger subject to both the pressure within the variable pressure chamber of the booster and atmospheric pressure is the area of that portion of the plunger slidably engaging the bearing. To return the plunger to its off position and at the same time to swing the lever so that the air valve moves to closed position and the vacuum valve moves to open position, I have provided the control coil spring 62 between the annular flange 56 and the disk 23. This control spring is of the constant rate type and has a strength which is sufficient to overcome the differential of pressure in the variable pressure chamber of the booster and atmospheric pressure and also to overcome the friction between the bearing and plunger. As a result but little force is required to move the push rod forwardly against the force exerted by the control spring.

For the purpose of creating feel through the push rod to the foot pedal, the reaction plunger 63 is provided. This plunger extends within the power plunger 12 and has its front end subject to the pressure of the braking liquid in the hydraulic cylinder, the braking liquid being prevented from passing between the reaction and power plungers by the sealing cup 64 and O-ring 65. The reaction rod has the reduced rear end portion 66 which extends through the disk 23 and is adapted to engage the sound deadening disk 67 at the front end of the plunger 51. 68 is a coil spring between the disk 23 and the shoulder 69 of the reaction plunger for normally holding the latter in forward position determined by the C washer 70 engaging a groove in the reduced portion 66 of the reaction plunger and abutting the rear side of the disk 23.

In operation, assuming the parts to be in the positions shown in Figures 1 and 2 and the source of vacuum to be in operation, both the vacuum chamber in front of the power piston 9 and the variable pressure chamber in rear of the power piston are under the same sub-atmospheric pressure because the vacuum valve 30 is open and the air valve 29 is closed. Upon forward movement of the push rod 3 under manual pressure the plunger 51 will be moved forwardly against the force exerted by the control spring 62 to swing the lever 39 about the air valve 29 as a fulcrum, thereby closing the vacuum valve 30. Then upon continued forward movement of the push rod, the lever is swung about the vacuum valve as a fulcrum against the combined force exerted by the control spring 62 and the leaf spring 46 and the air valve is allowed to open so that atmospheric air entering the variable pressure chamber of the booster in rear of the power piston moves the power piston forwardly which in turn moves the power plunger 12 forwardly and creates pressure in the hydraulic cylinder 2. This pressure overcomes the coil spring 68 so that the reaction plunger abuts the plunger 51 and transmits the pressure within the hydraulic cylinder to the push rod and creates feel. When the push rod 3 is relieved from manual pressure it is retracted and the plunger is moved rearwardly by the control spring 62 and the lever 39 is swung to first effect the closing of the air valve 29 and then effect the opening of the vacuum valve 30. By reason of the spacing of the air and vacuum valves, the lever 39 has highly advantageous lever arms and by reason of the cross sectional area of that portion of the plunger slidably engaging the bearing 52 being small relative to the internal cross sectional area of the tubular member 13, the control spring 62 is relatively weak and but little manual pressure is required to effect the operation of the booster.

The booster device shown in Figure 7 is in general quite similar to that of Figures 1–6 inclusive and operates in the same manner. However, it differs essentially in having the power piston 71 of the diaphragm type and in changing the valve construction by mounting the vacuum valve 72 on the actuating lever 73 and by providing the coil spring 74 for closing the air valve 75. The vacuum valve 72 is secured to the lever 73 by means of the pin 73' extending through the lever and having a press fit with the vacuum valve. The coil spring 74 has one end abutting the bottom of the yoke 76 and the other end abutting the lever in concentric relation with the mounting pin 77 upon the lever for the air valve. The yoke straddles the lever and has its sides fixedly secured to the plate 78 to which the valve seat inserts are bonded.

What I claim as my invention is:

1. In a booster device, a housing, a hydraulic cylinder at the front end of said housing, a power piston within said housing having a first passage for air under atmospheric pressure and a second passage for air under pressure differing from atmospheric pressure, a power plunger operatively connected to said power piston and extending forwardly through the front end of said housing into said hydraulic cylinder, a tube operatively connected to said power piston and extending rearwardly through the rear end of said housing, valves for controlling said passages, a manually operable push rod extending within said tube, and means operable by said push rod for actuating said valves comprising an element having an effective front face of smaller area than the internal cross-sectional area of said tube subject to the pressure within said housing at the rear side of said power piston and having an effective rear face of smaller area than the internal cross-sectional area of said tube subject to the pressure of atmospheric air, and a lever between said element and valves.

2. In a vacuum booster, a housing, a power piston within said housing having air and vacuum passages therethrough, a power plunger and a tube connected to the front and rear sides of said power piston and extending through said housing, valves for controlling said air and vacuum passages, a lever for actuating said valves, a manually operable angularly movable push rod extending within said tube, a bearing within the front end of said tube and a plunger extending through said bearing and operatively connected to said lever and push rod, the front end of said plunger being subject to the pressure within said housing at the rear side of said power piston and the rear end of said plunger being subject to the pressure of atmospheric air.

3. In a vacuum booster, a housing, a hydraulic cylinder at the front end of said housing, a power piston within said housing having air and vacuum passages therethrough, a power plunger connected to the front side of said power piston and extending through the front end of said housing into said hydraulic cylinder, a tube connected to the rear side of said power piston and extending through the rear end of said housing, sealing means between said cylinder and plunger and between said housing and tube, valves for controlling said air and vacuum passages, a manually operable push rod extending within said tube, a lever for actuating said valves, a bearing within the front end of said tube and having an air-tight seal therewith and an element extending through said bearing and having an air-tight seal therewith and operatively connected to said push rod and lever, said element having its front end subject to the pressure within said housing at the rear side of said power piston and its rear end subject to the pressure of atmospheric air.

4. In a vacuum booster, a housing, a hydraulic cylinder at the front end of said housing, a power piston within said housing having air and vacuum passages therethrough, a power plunger connected to the front side of said power piston and extending through the front end of said housing and within said hydraulic cylinder, a reaction plunger within said power plunger and having its front end subject to the hydraulic pressure within said hydraulic cylinder, a tube connected to the rear side of said power piston and extending through the rear end of said housing, sealing means encircling said plunger and tube, valves for controlling said air and vacuum passages, a manually operable angularly movable push rod extending within said tube, and means operable by said push rod for actuating said valves comprising a lever and a plunger for actuating said lever, said plunger extending within and being spaced from said tube and having an effective front face of smaller area than the internal cross-sectional area of said tube subject to the pressure within said housing at the rear side of said power piston and an effective rear face of smaller area than the internal cross-sectional area of said tube subject to the pressure of atmospheric air, said plunger being engageable with said reaction plunger during the forward movement of said power piston.

5. In a vacuum booster, a housing, a power piston within said housing having air and vacuum passages therethrough, valves for controlling said passages, a lever for actuating said valves, a manually operable angularly movable push rod, a tubular member secured to said power piston and extending through said housing, a slide within said tubular member abutted by said push rod and provided with a passageway for air, a bearing fixed within said tubular member and a plunger slidably engaging said bearing and abutting said slide and lever, said plunger having one end exposed to pressure of atmospheric air and the other end exposed to pressure varying from atmospheric to sub-atmospheric.

6. In a vacuum booster, a housing, a power piston within said housing having substantially radially aligned vacuum and air passages at one side of the axis of said power piston, said vacuum passage being radially inwardly of said air passage and located approximately midway between said air passage and the axis of said power piston, valves for controlling said air and vacuum passages, a lever operatively connected to said valves, a tube secured to said power piston and extending through said housing, a manually operable angularly movable push rod extending within said tube, a bearing within said tube, a plunger between said lever and push rod and extending through said bearing and movable in one direction by said push rod, and spring means for normally moving said plunger in the opposite direction.

7. In a booster device, a housing, a power piston within said housing having a first passage for air under atmospheric pressure and a second passage for air differing from atmospheric pressure, said first and second passages being substantially radially aligned at one side of the axis of said power piston, annular valve seats forming parts of said passages, valves for said passages engageable with said seats, and a mounting for said valves movable toward and away from said seats having a member operatively rotatably connected to one of said valves between its center of gravity and the seat engageable by said last mentioned valve.

8. In a vacuum booster, a housing, a power piston within said housing having substantially radially aligned vacuum and air passages at one side of the axis of said power piston, annular valve seats forming parts of said passages, valves for said passages engageable with said seats, one of said valves being rotatable with respect to its respective seat into and out of sealing engagement with said seat, and a lever carrying said valves and having a member rotatably abutting said rotatable valve between the center of gravity of said rotatable valve and the seat engageable by said rotatable valve.

References Cited in the file of this patent
UNITED STATES PATENTS

| | | |
|---|---|---|
| 2,415,035 | Penrose | Jan. 28, 1947 |
| 2,448,981 | Ingres | Sept. 7, 1948 |
| 2,520,374 | Rockwell | Aug. 29, 1950 |